(12) United States Patent
Bohley

(10) Patent No.: US 8,521,393 B2
(45) Date of Patent: Aug. 27, 2013

(54) CRUISE CONTROL DEVICE HAVING A SHUTOFF UNIT DEPENDENT ON THE OPERATING SPEED OF THE GAS PEDAL

(75) Inventor: Martin Bohley, Oberriexingen (DE)

(73) Assignee: Knorr-Bremse Systeme Fuer Nutzfahrzeuge GmbH, Munich (DE)

( * ) Notice: Subject to any disclaimer, the term of this patent is extended or adjusted under 35 U.S.C. 154(b) by 264 days.

(21) Appl. No.: 12/736,388

(22) PCT Filed: Apr. 8, 2009

(86) PCT No.: PCT/EP2009/002590
§ 371 (c)(1),
(2), (4) Date: Nov. 15, 2010

(87) PCT Pub. No.: WO2009/124740
PCT Pub. Date: Oct. 15, 2009

(65) Prior Publication Data
US 2011/0060512 A1    Mar. 10, 2011

(30) Foreign Application Priority Data

Apr. 11, 2008 (DE) .......................... 10 2008 018 472

(51) Int. Cl.
*B60T 8/24* (2006.01)
(52) U.S. Cl.
USPC .............................................. 701/95; 701/93
(58) Field of Classification Search
USPC ..................................................... 701/93, 95
See application file for complete search history.

(56) References Cited

U.S. PATENT DOCUMENTS

| | | | |
|---|---|---|---|
| 4,735,109 A | 4/1988 | Richards et al. | |
| 6,769,504 B2 | 8/2004 | Kobayashi et al. | |
| 6,789,009 B2 | 9/2004 | Schmitz et al. | |
| 6,988,028 B2* | 1/2006 | Iriyama | 701/93 |
| 2002/0121398 A1* | 9/2002 | Kikuchi et al. | 180/169 |
| 2003/0136596 A1* | 7/2003 | Iriyama | 180/170 |
| 2004/0093145 A1* | 5/2004 | Tanimichi et al. | 701/93 |
| 2004/0193354 A1* | 9/2004 | Dunoyer et al. | 701/96 |
| 2006/0058939 A1* | 3/2006 | Rayl et al. | 701/93 |
| 2006/0212207 A1* | 9/2006 | Sugano et al. | 701/93 |
| 2008/0153669 A1* | 6/2008 | Peterson | 477/197 |
| 2009/0125203 A1* | 5/2009 | Lindqvist et al. | 701/96 |

FOREIGN PATENT DOCUMENTS

| | | |
|---|---|---|
| DE | 103 47 844 | 5/2005 |
| DE | 10 2005 052 032 | 5/2007 |
| EP | 1 103 742 | 5/2001 |
| EP | 1 247 685 | 10/2002 |
| EP | 1 769 962 | 4/2007 |

OTHER PUBLICATIONS

"Kraftfahrtechnisches Taschenbuch" [Automotive Technology Handbook] of Robert Bosch GmbH, 26th Edition, Friedr. Vieweg & Sohn Verlag/GMBV Fachverlage GmbH, Wiesbaden, 2007, pp. 1078 through 1082.

(Continued)

*Primary Examiner* — Hussein A. Elchanti
(74) *Attorney, Agent, or Firm* — Kenyon & Kenyon LLP

(57) ABSTRACT

A vehicle having a cruise control device, a manual shift transmission without synchronizer assembly, and a gas pedal provided with a pedal sensor, which produces a power request signal as a function of a power request of the driver. The cruise control device is deactivated as a function of a speed at which the power request signal of the pedal sensor changes.

22 Claims, 1 Drawing Sheet

(56) References Cited

OTHER PUBLICATIONS

European Patent Office, International Preliminary Report on Patentability and Written Opinion, Oct. 21, 2010, from International Patent Application No. PCT/EP2009/002590, filed on Apr. 8, 2009.

European Patent Office, Translation of international Preliminary Report on Patentability and Written Opinion, Nov. 18, 2010, from International Patent Application No. PCT/EP2009/002590, filed on Apr. 8, 2009.

* cited by examiner

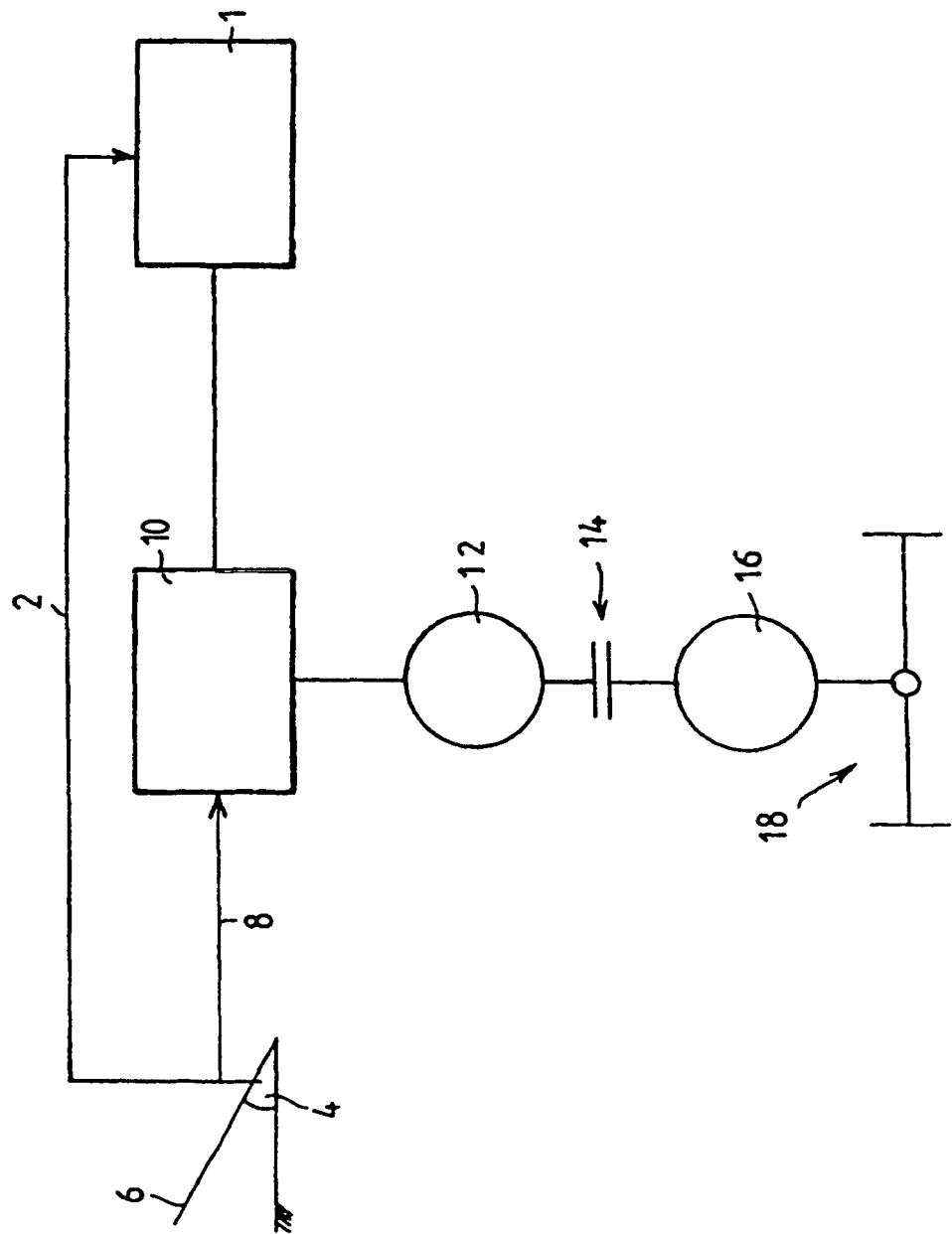

# CRUISE CONTROL DEVICE HAVING A SHUTOFF UNIT DEPENDENT ON THE OPERATING SPEED OF THE GAS PEDAL

FIELD OF THE INVENTION

The present invention relates to a vehicle having a cruise control device, having a manual shift transmission without synchronizer assembly, and having a gas pedal, which is provided with a pedal sensor, which produces a power request signal as a function of a power request of the driver, and to a method for controlling a device that regulates the speed of a vehicle.

BACKGROUND INFORMATION

A cruise control device of a vehicle is discussed in the related art, for example, in the Kraftfahrtechnischen Taschenbuch [Automotive Technology Handbook of] der Robert Bosch GmbH, 26th edition, Friedr. Vieweg & Sohn Verlag/GMV Fachverlage GmbH, Wiesbaden, 2007, pages 1079 through 1082. In addition to the cruise control, an adaptive cruise control (ACC) detects the distance and the relative speed to a preceding vehicle and uses these variables to regulate a time gap between the vehicles. The driver specifies the setpoint speed and the setpoint time gap, the time gap to the preceding vehicle being calculated from radar signals and being compared to the setpoint time gap set by the driver. If the time gap falls below the setpoint time gap, the ACC system responds by reducing the engine torque and, if necessary, by automatically initiating braking.

On the other hand, modern motor vehicles, in particular utility vehicles, have pedal modules, in which the position or a positioning speed of the pedals, in particular the gas pedal, is detected by pedal sensors and an electrical power request signal is input via a data bus into a control unit, in particular into an engine control unit, in order to activate a drive engine in accordance with the power intent.

In some countries, utility vehicles having manual shift transmissions without a synchronizer assembly are still used. This type of transmission makes it possible to change the driving gear without having to operate the clutch. In order to be able to perform a shift action, however, the drivetrain must be briefly relieved, otherwise it is not possible to shift into idle without using the clutch. For this purpose, the driver gives a brief gas surge using the gas pedal. The shift action request is therefore triggered by a gas surge.

However, if the speed of the vehicle is automatically regulated as described above by a cruise control device, for example, a brief gas surge which is only performed for shifting has the result that the cruise control interferes in an undesired way. In this case, shifting into idle without operating the clutch is not possible, which results in a certain reduction of comfort.

SUMMARY OF THE INVENTION

With respect thereto, an object of the exemplary embodiments and/or exemplary methods of the present invention is to refine a vehicle having a cruise control device and having a manual shift transmission without synchronizer assembly of the type mentioned at the beginning in such a way that a greater shift comfort is achieved. For the same purpose, a method for controlling a device which regulates the speed of a vehicle is to be specified.

This object is achieved according to the exemplary embodiments and/or exemplary methods of the present invention by the features described herein.

The exemplary embodiments and/or exemplary methods of the present invention is based on the idea that the cruise control device is deactivated as a function of a speed at which the power request signal of the pedal sensor changes. In other words, in the event of a brief gas surge, i.e., at a relatively high speed at which the power request signal of the pedal sensor is increased and again decreased, the cruise control is deactivated, so that it may not interfere with the gear change.

By analyzing the power request signal produced by the pedal sensor, which reflects the driver intent, which may be in the control unit of the cruise control, a shift action may therefore be recognized, which is triggered by a gas surge of the driver. The cruise control is briefly deactivated, i.e., during the time required for the gear change, to relieve the drivetrain. The driver may then shift without operating the clutch.

Advantageous refinements and improvements of the exemplary embodiments and/or exemplary methods of the present invention specified herein are possible by way of the measures listed in the subclaims.

The cruise control device may particularly be deactivated when the speed, at which the power request signal of the pedal sensor changes, exceeds an upper limiting value. This upper limiting value is determined, for example, by the value which a typical gas surge for the gear change regularly exceeds.

Cruise controls for speed regulation are typically integrated in ACC systems, so that the regulation of the speed may be performed in the scope of a regulation of the time gap between the vehicle and a preceding vehicle.

The pedal sensor of the gas pedal and a control unit of the cruise control device are connected to a shared data bus for data exchange, for example, so that the power request signals which are detected by the pedal sensor may be input into the control unit.

The control unit of the cruise control device may be implemented to deactivate the regulation of the speed as a function of the speed at which the power request signal of the pedal sensor changes.

A more precise explanation is given in the following description of an exemplary embodiment.

An exemplary embodiment of the present invention is shown hereafter in the drawing and explained in greater detail in the following description.

BRIEF DESCRIPTION OF THE DRAWING

The FIGURE shows a schematic circuit diagram of a drivetrain of a utility vehicle according to a specific embodiment of the present invention.

DETAILED DESCRIPTION

A drivetrain of a utility vehicle contains a cruise control device, which may be combined with a regulator of a time gap between the utility vehicle and preceding vehicles (adaptive cruise control, ACC).

The cruise control device includes a control unit 1, which receives, via a data bus 2, the electrical output signals of a pedal sensor 4 of a gas pedal 6 operated by the driver of the utility vehicle as power request signals. These power request signals may also be input via a data bus 8 into an engine control unit 10, in order to produce control signals therein for final control elements of a drive engine 12 of the utility vehicle therein.

Pedal sensor 4 may be a rotational angle sensor, which measures the rotational angle of gas pedal 6 in relation to a bearing bracket and outputs a signal for the rotational angle as the output signal, which forms the power request signal for engine control unit 10 of drive engine 12.

The power produced by drive engine 12 is mechanically input into a manual shift transmission 16 without synchronizer assembly via an interrupting clutch 14, which is operable by the driver. It is possible to shift into multiple driving gears with the aid of shift transmission 16, in order to provide a specific torque and a specific rotational speed at a drive axle 18 of the utility vehicle.

Control unit 1 of the cruise control calculates a speed at which the rotational angle signal of pedal sensor 4 changes per unit of time, from the power request signal of pedal sensor 4 representing the rotational angle, by differentiation, for example. This speed is a measure of how rapidly the driver operates gas pedal 6 or how rapidly gas pedal 6 is set back by spring forces, for example.

Control unit 1 of the cruise control is implemented to deactivate the cruise control as a function of the speed at which the power request signal of pedal sensor 4 changes. In particular, the cruise control is deactivated if the speed at which the power request signal of pedal sensor 4 changes exceeds a specified upper limiting value. This upper limiting value is determined by the value which a typical gas surge for changing gears exceeds on a regular basis.

During a brief gas surge, i.e., in the event of a relatively high speed, at which the power request signal of pedal sensor 4 is increased and again decreased, the cruise control is therefore deactivated, so that it may not interfere with the driving gear change in the shift transmission and in order to relieve the drivetrain. The driver may then shift without operating the clutch.

The List of reference numerals is as follows:
1 control unit (device)
2 data bus
4 pedal sensor
6 gas pedal
8 data bus
10 engine control unit
12 drive engine
14 clutch
16 shift transmission
18 drive axle

What is claimed is:

1. A vehicle, comprising:
  a cruise control device;
  a manual shift transmission without synchronizer assembly; and
  a gas pedal having a pedal sensor, which produces a power request signal as a function of a power request of the driver, wherein the cruise control device is deactivated as a function of a speed at which the power request signal of the pedal sensor changes.

2. The vehicle of claim 1, wherein the cruise control device is deactivated when the speed at which the power request signal of the pedal sensor changes exceeds an upper limiting value.

3. The vehicle of claim 1, wherein the regulation of the speed is performed within the scope of a regulation of a time gap between the vehicle and a preceding vehicle.

4. The vehicle of claim 1, wherein the pedal sensor and a control unit of the cruise control device are connected to a data bus for data exchange.

5. The vehicle of claim 1, wherein the control unit of the cruise control device is configured to deactivate the cruise control as a function of the speed at which the power request signal of the pedal sensor changes.

6. The vehicle of claim 1, wherein the vehicle is a utility vehicle.

7. The vehicle of claim 1, wherein the cruise control device is deactivated when the speed at which the power request signal of the pedal sensor changes exceeds an upper limiting value, and wherein the regulation of the speed is performed within the scope of a regulation of a time gap between the vehicle and a preceding vehicle.

8. The vehicle of claim 7, wherein the pedal sensor and a control unit of the cruise control device are connected to a data bus for data exchange.

9. The vehicle of claim 8, wherein the control unit of the cruise control device is configured to deactivate the cruise control as a function of the speed at which the power request signal of the pedal sensor changes.

10. The vehicle of claim 7, wherein the control unit of the cruise control device is configured to deactivate the cruise control as a function of the speed at which the power request signal of the pedal sensor changes.

11. The vehicle of claim 7, wherein the vehicle is a utility vehicle.

12. A method for controlling a device which regulates the speed of a vehicle, the method comprising:
  determining, using a hardware processor, a speed at which a power request signal of a pedal sensor of a gas pedal changes; and
  deactivating the device as a function of the speed at which the power request signal of the pedal sensor of the gas pedal changes.

13. The method of claim 12, wherein the cruise control device for regulating the speed is deactivated when the speed at which the power request signal of the pedal sensor changes exceeds an upper limiting value.

14. The method of claim 12, wherein the regulation of the speed of the vehicle is performed within the scope of a regulation of a time gap between the vehicle and a preceding vehicle.

15. The method of claim 12, wherein the pedal sensor and a control unit of the cruise control device are connected to a data bus for data exchange.

16. The method of claim 12, wherein the control unit of the cruise control device is configured to deactivate the cruise control as a function of the speed at which the power request signal of the pedal sensor changes.

17. The method of claim 12, wherein the vehicle is a utility vehicle.

18. The method of claim 12, wherein the cruise control device for regulating the speed is deactivated when the speed at which the power request signal of the pedal sensor changes exceeds an upper limiting value, and wherein the regulation of the speed of the vehicle is performed within the scope of a regulation of a time gap between the vehicle and a preceding vehicle.

19. The method of claim 18, wherein the pedal sensor and a control unit of the cruise control device are connected to a data bus for data exchange.

20. The method of claim 19, wherein the control unit of the cruise control device is configured to deactivate the cruise control as a function of the speed at which the power request signal of the pedal sensor changes.

21. The method of claim 18, wherein the control unit of the cruise control device is configured to deactivate the cruise control as a function of the speed at which the power request signal of the pedal sensor changes.

22. The method of claim 18, wherein the vehicle is a utility vehicle.

* * * * *

UNITED STATES PATENT AND TRADEMARK OFFICE
CERTIFICATE OF CORRECTION

PATENT NO. : 8,521,393 B2  Page 1 of 1
APPLICATION NO. : 12/736388
DATED : August 27, 2013
INVENTOR(S) : Martin Bohley It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 298 days.

Signed and Sealed this

Fifteenth Day of September, 2015

Michelle K. Lee
*Director of the United States Patent and Trademark Office*